(12) United States Patent
Morrison et al.

(10) Patent No.: US 8,359,292 B2
(45) Date of Patent: Jan. 22, 2013

(54) SEMANTIC GROUPING FOR PROGRAM PERFORMANCE DATA ANALYSIS

(75) Inventors: Vance Morrison, Kirkland, WA (US); Joshua Ryan Williams, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 131 days.

(21) Appl. No.: 12/885,714

(22) Filed: Sep. 20, 2010

(65) Prior Publication Data

US 2012/0072423 A1   Mar. 22, 2012

(51) Int. Cl.
*G06F 17/30* (2006.01)
(52) U.S. Cl. ........................................... 707/688
(58) Field of Classification Search .................... 707/688
See application file for complete search history.

(56) References Cited

U.S. PATENT DOCUMENTS

| | | | |
|---|---|---|---|
| 6,028,605 A | 2/2000 | Conrad et al. | |
| 7,289,947 B2 * | 10/2007 | Ammons | 703/22 |
| 7,464,373 B1 | 12/2008 | Yunt et al. | |
| 7,571,177 B2 | 8/2009 | Damle | |
| 7,634,471 B2 | 12/2009 | Chen et al. | |
| 2002/0059161 A1 | 5/2002 | Li | |
| 2007/0067260 A1 * | 3/2007 | Marsnik et al. | 707/2 |
| 2007/0294681 A1 | 12/2007 | Tuck et al. | |
| 2008/0040308 A1 | 2/2008 | Ranganathan et al. | |
| 2008/0127116 A1 | 5/2008 | Kosche et al. | |
| 2010/0083228 A1 | 4/2010 | Branda et al. | |

OTHER PUBLICATIONS

Chen, et al., "Stack-based Algorithms for Pattern Matching on DAGs", Retrieved at << http://www.sdsc.edu/~gupta/publications/stackd-vldb-camera.pdf >>, Proceedings of the 31st international conference on Very large data bases , Aug. 30-Sep. 2, 2005, pp. 12.
Wang, et al., "SIMPLIcity: Semantics-Sensitive Integrated Matching for Picture Libraries", Retreived at << http://infolab.stanford.edu/~wangz/project/imsearch/SIMPLIcity/TPAMI/wang2.pdf >>, Proceedings of the 4th International Conference on Advances in Visual Information Systems, Nov. 2-4, 2000, p. 947-963.
"Pattern Matching for Construct Validity", Retrieved at << http://www.socialresearchmethods.net/kb/pmconval.php >>, Jul. 2, 2010, pp. 5.
Vanleenhove, Maarten, "Best Practices in Modelling IBM Cognos 8 Semantic Layers", Retreived at << http://www.element61.be/e/resourc-detail.asp?ResourceId=7 >>, Oct. 13, 2008, pp. 6.
"How to: Filter Profiling Tools Report Views to Display Just My Code", Retreived at << http://msdn.microsoft.com/en-us/library/dd264988.aspx >>, Copyright 2010, pp. 1.
Williams, Josh, "PerfiConsole", Retreived via link at << http://www.microsoft.com/downloads/en/details.aspx?familyid=5a04ee30-6259-4fad-bf05-ccb72be09b4a&displaylang=en >>, Copyright 2003, 2006, pp. 22.

* cited by examiner

*Primary Examiner* — Baoquoc N To
(74) *Attorney, Agent, or Firm* — Ogilvie Law Firm

(57) ABSTRACT

Particular portions of program execution data are specified and organized in semantic groups. A grouping expression written in a transformation syntax language specifies a pattern and a replacement, for grouping performance data samples. An exception to the pattern can also be specified. In response to the grouping expression, a cost accounting shows groups and their costs. The grouping expression may operate on names and/or name-associated characteristics such as private/public status, author, directory, and the like. Samples may represent nodes in a directed acyclic graph memorializing call stacks or memory allocation. Grouping expressions are used to group nodes and consolidate costs by various procedures when making modified sample stacks: clustering-by-name, entry-group-clustering, folding-by-name, a folding-by-cost. An entry group clustering shows at least one entry point name while avoiding unwanted detail.

20 Claims, 3 Drawing Sheets

SEMANTIC GROUPING FOR PROGRAM PERFORMANCE DATA ANALYSIS

BACKGROUND

Program performance analysis investigates a program's behavior using dynamic information, namely, information that is gathered as the program executes. Static information, which is obtained without running the program, may also be used in performance analysis. A profiler is a tool that obtains information about the dynamic behavior of a program, such as the frequency and duration of function calls, and which calls are made in what order. Some profilers obtain information about memory usage and/or about usage of other resources during program execution.

Profilers may use various techniques to collect data about program execution, such as hardware interrupts, code instrumentation, instruction set simulation, operating system hooks, and/or performance counters. Some profilers probe a program's program counter and call stack at regular intervals, e.g., by using operating system interrupts or dedicated hardware, to obtain samples of program state during execution. Profilers may be part of an Integrated Development Environment (IDE) which also includes a compiler, a debugger, an editor, and other program development tools.

Although application programs are often profiled, other kinds of "programs" (in a broad sense of the word, which is used herein) can also be profiled, such as libraries, drivers, interrupt handlers, threads, processes, and kernels. While and/or after gathering the execution profile data, the profiler and/or other tools may also be used to present and analyze the data. For example, call graphs may be automatically created and displayed, to show the call times, frequencies, and call stacks for developer-specified functions, and corresponding source code may be displayed on request.

SUMMARY

Program execution data can be large and complex, so developers appreciate having a variety of tools and techniques for specifying particular portions of the execution data and for organizing that data. Some embodiments described herein help organize program performance data in semantic groups. The performance data includes multiple samples, with each of the multiple samples having at least one name and at least one associated cost. In some embodiments, the developer submits a grouping expression to a performance analysis tool to specify and organize performance data. The grouping expression is written in a transformation syntax language, and specifies both a pattern and a replacement for grouping multiple performance data samples. In some cases an exception to the pattern can also be specified. In response to the grouping expression, the developer gets a cost accounting from the performance analysis tool. The cost accounting shows names of the performance data samples (consistent with the grouping expression) and associated attributed costs.

For example, in some embodiments, the grouping expression defines an entry group clustering, and the cost accounting shows at least one entry point name. This allows the developer to see the name of an operating system function that was called upon entry to operating system code, while avoiding unwanted detail about the rest of the execution activity while control was inside the operating system code. A grouping expression may also specify other patterns, e.g., by matching at least one directory containing program code in order to group that program code and the corresponding samples and their costs, for display and performance analysis.

In some embodiments, the grouping expression may operate on names (e.g., function names) and/or on name-associated characteristics, of the performance data samples. Name-associated characteristics include characteristics associated in digital data storage with a named sample, e.g., a function may have automatically determinable characteristics such as private/public status, author, development group owner, source directory, and the like. Accordingly, in some embodiments a grouping specification may be relatively detailed, such as a grouping expression which puts in a single group all names and costs of code owned by development group Alpha and/or owned by developer Pat, except for code which resides in directory Released or one of its subdirectories.

Some embodiments obtain program performance data which includes multiple samples, each of the samples having a stack of names which represent nodes located in a directed acyclic graph (DAG) such as a call stack DAG or a memory allocation DAG, with each of the DAG nodes having an associated cost. Upon receiving a grouping expression written in a transformation syntax language, the embodiment groups nodes and consolidates costs by following at least one of the following procedures: a clustering-by-name procedure, an entry-group-clustering procedure, a folding-by-name procedure, a folding-by-cost procedure. Costs are consolidated by associating with each group a total cost which is the sum of the cost(s) associated with individual node(s) of the group. A resulting cost accounting shows group name(s) and associated group costs after grouping nodes and consolidating costs.

Under the clustering-by-name procedure, nodes are placed into a group on the basis of node names and irrespective of node locations in the DAG. Under the entry-group-clustering procedure, nodes are placed into an entry group on the basis of node names; an entry node of the group is a border node of the entry group nodes in the DAG. The cost accounting shows the entry group name together with the entry node name. Under the folding-by-name procedure, nodes are placed into a group represented by a remaining node on the basis of the nodes being reachable in the DAG from the remaining node and on the basis of node names. For example, if the remaining node represents a method which invokes helper methods, then the helper methods can be grouped with (and their costs consolidated with) the remaining node. Under the folding-by-cost procedure, nodes are placed into a group represented by a remaining node on the basis of the nodes being reachable in the DAG from the remaining node and on the basis of node cost being less than a specified threshold. In a variation, an embodiment may consider the sum of the inclusive cost of all nodes with the specified name across an entire profile. This may fold fewer nodes, but the ones it folds are more likely to be irrelevant.

In some embodiments, performance data residing in a memory has multiple samples, each of the samples having a stack of names which represent nodes in a DAG, and each of the nodes having an associated cost. The memory is in operable communication with a logical processor. A modified stack also resides in the memory. The modified stack has at least a portion of at least one name and/or at least one name-associated characteristic in common with a stack of the performance data, but the modified stack is different from the performance data in that at least one of the following is present in the modified stack and absent from the performance data: a clustering-by-name group, an entry-group-clustering group, a folding-by-name group, a folding-by-cost group. In some embodiments, a performance analysis tool also resides in the memory. The tool is configured for execution with the logical processor, and in particular is configured to produce modified stacks.

For example, the memory may contain a clustering-by-name grouping specification which groups all nodes of a specified library into a single group which is present in the modified stack. As another example, the memory may contain a clustering-by-name grouping specification which groups all nodes by library except for the nodes of a specified library. As yet another example, the memory may contain an entry-group-clustering grouping specification which groups all nodes of an operating system into a single group, which is present in the modified stack with an entry point name identifying an operating system call made upon entry to the group.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
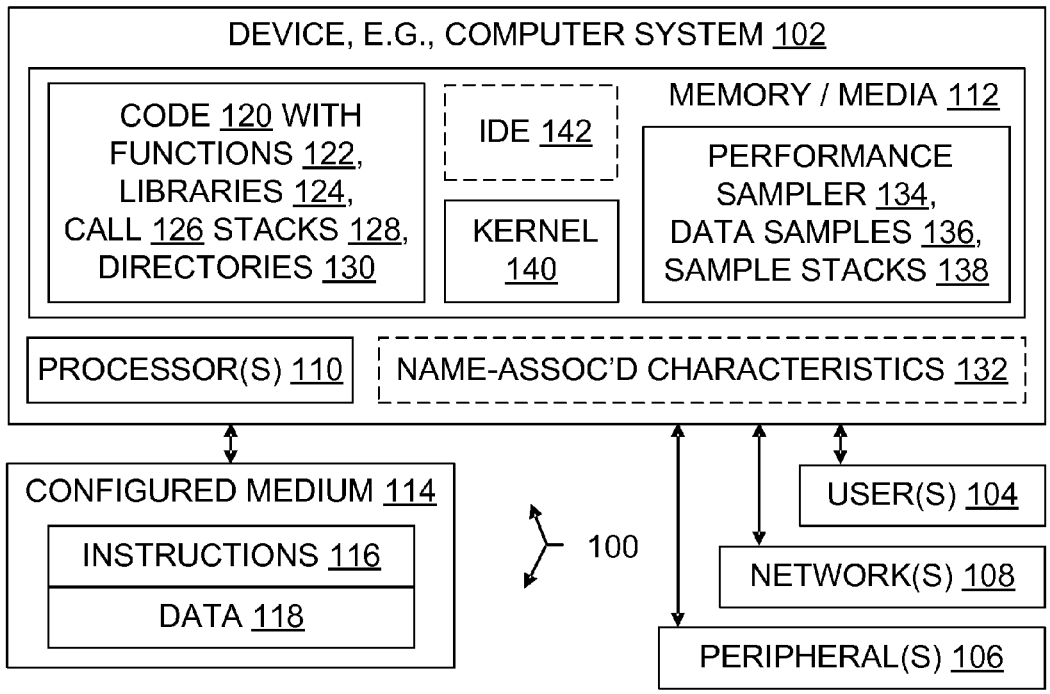
FIG. 1 is a block diagram illustrating a computer system having at least one processor, at least one memory, at least one program whose code has been profiled by a performance sampler, execution data samples thus obtained, and other items in an operating environment which may be present, possibly on multiple network nodes, and also illustrating configured storage medium embodiments.

When an application or other computer program has performance problems, familiar techniques can be used to collect information about where the program spends time and/or about how other resources such as memory were consumed during program execution. The result of this data collection can be a list of samples which tag the consumption of some resource (e.g., CPU time or memory) with the name of the function that consumed it, as well as the stack of function names that were active at the time. Familiar tools show this data in familiar call-tree, caller-callee, and/or by-function views, for example.

Unfortunately, these views are often frustrating, even for programs that are only moderately complex. An interesting operation is often executed by running dozens to hundreds of individual functions. Thus, while the time devoted to a single semantic action might be sizable, it can be spread over a large number of individual functions and thus a by-function view tends to give little help understanding the program's behavior.

Some call-tree views do aggregate the cost of all functions called, by function. However, call-tree views can be frustrating to use when they do not aggregate all time to a given function because that function is called in different contexts. Moreover, call-tree views may also show the exact call stack, complete with many (often dozens) of helper functions, which makes the data difficult to understand.

At least one familiar profiler provides a feature for a version of "just my code" profiling. In this feature, code is partitioned into code that the developer implemented (so-called "my code"), and all other code. Code that is not "my code" is grouped together by the function that was called from "my code". Although this feature can be helpful, this kind of partitioning is relatively inflexible. The main control available is simply to turn on or turn off the feature.

Some embodiments described herein can help developers find program performance problems by grouping the program's resource consumption along semantically relevant lines. For example, the developer may eliminate separate helper calls, calls to the operating system, or other third party code, relatively quickly and easily. By grouping resource consumption in this way, costs can be accurately assigned to semantic components rather than particular functions, which may dramatically reduce the number nodes the programmer should consider.

Some embodiments leverage familiar pattern matching techniques, as well as the concept of grouping samples by cost by entry function to the group, and the concept of folding costs into caller nodes, allowing developers to quickly and easily form semantically relevant groups. Once these groups are formed, the costs of the program's execution can be assigned to semantic groups. Developers can then "drill down" into the cost associated with just one group independently of any other group, making performance investigation less frustrating.

Some embodiments support developer use of an "entry point group" technique. Under this technique all costs associated with functions within a group are assigned to the function that was used (called), to enter the group. Thus, all (typically private) helper functions within the group are folded together in a semantically relevant way.

Some embodiments provide developers with a "folding" ability to remove particular functions from all views by assigning their cost to their caller. This allows users to explicitly remove helper calls and other semantically irrelevant functions from consideration without perturbing the overall costs of the nodes that are left. In some embodiments, folding can be done either by name (pattern matching), or by cost threshold. Folding by cost threshold allows users to quickly remove all functions that have low cost, assigning their costs to the surviving nodes, thereby simplifying the resulting display.

In some embodiments, grouping techniques discussed herein can be applied to any costs that need to be aggregated hierarchically, e.g., by tree structured inclusion. Such costs may be associated with function call trees, in which nodes are function names and links are caller-callee relationships, for example. As another example, some embodiments provide grouping for memory analysis, in which the nodes are blocks of memory, and the links are refers-to relationships.

Some embodiments described herein may be viewed in a broader context. For instance, concepts such as performance analysis, names, costs, execution sample grouping, and consolidation may be relevant to a particular embodiment. However, it does not follow from the availability of a broad context that exclusive rights are being sought herein for abstract ideas; they are not. Rather, the present disclosure is focused on providing appropriately specific embodiments. Other media, systems, and methods involving performance analysis, names, costs, execution sample grouping, and/or consolidation are outside the present scope. Accordingly, vagueness and accompanying proof problems are also avoided under a proper understanding of the present disclosure.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Terms may be defined, either explicitly or implicitly, here in the Detailed Description and/or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit. For example a hyper-threaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

"Automatically" means by use of automation (e.g., general purpose computing hardware configured by software for specific operations discussed herein), as opposed to without automation. In particular, steps performed "automatically" are not performed by hand or on paper or in a person's mind; they are performed with a machine. However, "automatically" does not necessarily mean "immediately".

Throughout this document, use of the optional plural "(s)" means that one or more of the indicated feature is present. For example, "sample(s)" means "one or more samples" or equivalently "at least one sample".

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as "submitting", "transmitting to", "sending toward", or "communicating to" a destination may involve intervening action such as forwarding, copying, uploading, downloading, encoding, decoding, compressing, decompressing, encrypting, decrypting and so on by some other party, yet still be understood as being performed directly by the party of interest.

Whenever reference is made to data or instructions, it is understood that these items configure a computer-readable memory thereby transforming it to a particular article, as opposed to simply existing on paper, in a person's mind, or as a transitory signal on a wire, for example.

The syntax "Pattern→Replacement" and the syntax "Pattern=>Replacement" are examples of transformation syntaxes, which refer to transforms. The Pattern and the Replacement (and an Exception if also specified) can be written in a transformation syntax language, such as a language that uses regular expressions and/or other pattern-matching mechanisms. In some discussions, a pattern and replacement are collectively referred to by referring to the pattern.

For better legibility and because many terms are being defined, quotation marks are not widely used in the following seven paragraphs. But it will be appreciated that these seven paragraphs nonetheless contain examples and other definitions of terminology that is used herein. Other terms may be likewise defined elsewhere herein without explicit quotation marks.

A performance sample includes a stack of names. A name resides in a namespace, such as the namespace formed by prefixing method names with file system paths. Each name has an associated cost. The names represent nodes which are related by links in a directed acyclic graph (DAG), such as a caller-callee relationship in a call stack DAG or a refers-to relationship in a memory allocation DAG. In the case of a call stack DAG, nodes may be methods or other code and cost may be processor time, and in the case of a memory allocation DAG nodes may be objects or other blocks of memory and cost may be memory size.

A transform includes a pattern and a replacement. The pattern and the replacement may be defined using regular expressions, for example. The transform operates on a stack of names by matching one or more names to the pattern and then changing the matched name(s) to match the replacement. The entire name is changed, not just the portion that matches the pattern.

A group is a list of names in a stack. A given stack may include one or more groups. Careful attention to context will allow the reader to determine whether "stack" refers to a call stack or a stack of performance data samples (which may be derived from a call stack, or from other performance data such as memory usage data).

Clustering is an operation that groups DAG nodes and aggregates their costs solely on the basis of the names of the nodes. Clustered nodes do not necessarily have any relationship in the DAG. For example, clustering could be used to aggregate all the costs associated with methods (nodes) whose code resides in a specified directory, regardless of whether those methods call one another.

Entry group clustering is a particular kind of clustering in which nodes of a stack have been clustered into two or more groups, each of which has a group name and an entry name. The group name is shared by all the names of the nodes that were clustered to form the group, e.g., a group may be formed by clustering all methods whose names place them in a specified DLL. The entry name is the name of the first node in the group, e.g., the name of the first method called within a specified DLL. A given DLL, for example, may be entered through different methods of the DLL, in which case the DLL group name may be the same for several groups, with a different entry name for each of those groups. In other words, for a given stack the 'entry point' is the first (closest to the root) entry in the stack; stacks/DAG information is used in deciding what potential entry point is actually first.

Folding is an operation that groups DAG nodes and aggregates their costs based on the relationship of the named nodes in the DAG, and on a folding sieve. The folding sieve may specify nodes according to their name (folding by name), according to their associated cost (folding by cost), or both. As an example of folding by name, assume a first node having a first name is related in the DAG to a second node having a second name, and assume the first name matches the folding sieve. Then the first node can be folded into the second node, in which case the first name is removed from the stack and the cost associated with the first name is added to the cost associated with the second name. As an example of folding by cost, assume a first node and a related second node, and assume the first node's cost matches the folding sieve, e.g., is less than a specified threshold. Then the first node can be folded into the second node, in which case the first name is removed from the stack and the cost associated with the first name is added to the cost associated with the second name.

A name-associated characteristic is a characteristic associated in digital data storage with a named sample. For instance, a function (or equivalently a method) may have automatically determinable name-associated characteristics such as private/public status, author, development group owner, source directory, and the like. Unless otherwise indicated, any transformation or other operation described herein that can be performed using a name can also be performed using name-associated characteristic(s).

Operating Environments

With reference to FIG. 1, an operating environment 100 for an embodiment may include a computer system 102. The computer system 102 may be a multiprocessor computer system, or not. An operating environment may include one or more machines in a given computer system, which may be clustered, client-server networked, and/or peer-to-peer networked.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more computer-readable storage media 112. Media 112 may be of different physical types. The media 112 is volatile memory, non-volatile memory, fixed in place media, removable media, magnetic media, optical media, and/or other storage media devices (as opposed to merely a signal). In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a computer-readable storage medium 112. Some other examples of computer-readable storage media 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein, e.g., by grouping, associating, consolidating, clustering, folding, binding, deployment, execution, modification, display, creation, loading, and/or other operations.

Program code 120 with functions 122, libraries 124, calls 126 and call stacks 128, file system directories 130, and other items shown in the Figures may reside partially or entirely within one or more media 112, thereby configuring those media. Some environments include program code 120 which has been profiled; some do not. Some include name-associated characteristics 132, such as author/owner names in a source code control system, for example. Some include a profiler or other performance sampler 134, as well as execution data samples 136 organized in sample stacks 138; some include only the data samples 136, with the profiler being located elsewhere. Some environments include a kernel 140. In addition to memory, an operating environment may also include other hardware, such as buses, power supplies, and accelerators, for instance.

A given operating environment 100 may include an Integrated Development Environment (IDE) 142 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Oracle America, Inc.), and some include environments which utilize languages such as C++ or C# ("C-Sharp"), but teachings herein are applicable with a wide variety of programming languages, programming models, and programs, as well as with endeavors outside the field of software development per se that use program performance analysis.

One or more items are shown in outline form in FIG. 1 to emphasize that they are not necessarily part of the illustrated operating environment, but may interoperate with items in the operating environment as discussed herein. It does not follow that items not in outline form are necessarily required, in any Figure or any embodiment.

Systems

Figure 2:
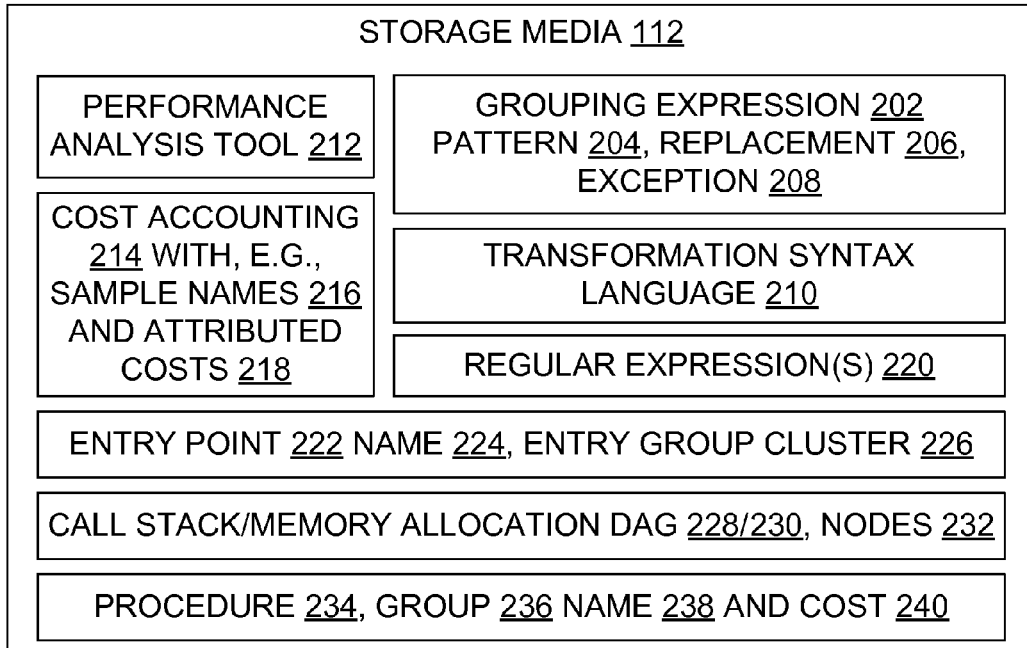
FIG. 2 is a block diagram illustrating an example architecture for embodiments that provide semantic grouping of performance data through the use of grouping expressions as discussed herein.

FIG. 2 illustrates an architecture which is suitable for use with some embodiments. A grouping expression 202 containing a pattern 204 and a replacement 206 (and optionally also containing an exception 208) can be used by a developer to specify portions of performance data 322 and to organize the data for analysis. The grouping expression is written in a transformation syntax language 210, which may use regular expressions 220, for example, in specifying the pattern and/or the replacement. The grouping expression is submitted to a performance analysis tool 212 which groups data samples 136 as indicated by the expression 202 and produces a cost accounting 214. The cost accounting may include performance sample names 216 and attributed costs 218 such as CPU cycles or memory byes used, for example.

The grouping expression may be used to get a cost accounting in which an entry point 222 to a group of code is specified by name 224. For instance, the name of a function called on entry to operating system code may be produced as part of an accounting 214 in which operating system code is an entry group (a.k.a. entry group cluster 226, in view of the clustering performed to make the group).

More generally, the performance samples 136 may be represented as nodes 232 in a directed acyclic graph (DAG), of which trees are one example. Perhaps the most frequently encountered DAG will be a call stack DAG 228, but grouping expressions 202 may also be used in some embodiments to produce cost accountings 214 from a memory allocation DAG 230, for example. A memory profiling graph will not necessarily originate as a DAG, but may be transformed into a DAG using familiar techniques. Although many of the examples herein involve CPU profiling and/or memory profiling, a given embodiments may process other kinds of weighted trees or DAGs. For example, some embodiments facilitate analysis of crash stacks, which can help identify dangerous portions of code as opposed to (or in addition to) identifying relatively expensive portions of code. Various grouping procedures 234 may be available in a given embodiment to organize the execution data samples 136 into groups 236, to name 238 those group(s), and to attribute costs thereby associating a total group cost 240 with a given group 236. An entry group cluster 226 is one example of a group 236.

With reference to FIGS. 1 and 2, some embodiments provide a computer system 102 with a logical processor 110 and a memory medium 112 configured by circuitry, firmware, and/or software to transform a performance data samples 136 and/or sample stacks 138 based on grouping expressions 202 as described herein.

One embodiment of a computer system includes a logical processor 110, a memory 112 in operable communication with the logical processor, performance data 322 (data samples 136 and/or sample stacks 138) residing in the memory, and at least one of the following: a modified sample stack produced using a grouping expression as discussed herein, a performance analysis tool for creating such a modified sample stack.

In one embodiment, the performance data 322 has multiple samples 136. Each of the samples has a stack 138 of names 216 which represent nodes 232 located in a directed acyclic graph (DAG). Each of the nodes has an associated cost 218. A modified stack 366 also resides in the memory. The modified stack has at least a portion of at least one name 216 and/or at least one name-associated characteristic 132 in common with a stack 138 of the performance data. However, the modified stack is different from the performance data in that at least one of the following is present in the modified stack and absent from the performance data: a clustering-by-name group 236, an entry-group-clustering group 236, a folding-by-name group 236, a folding-by-cost group 236. These groups are produced using respective procedures 234, as discussed in greater detail elsewhere herein.

With regard to name-associated characteristics 132, some examples include private/public and other intermediate representation attributes, author, development group or department owner, and others noted herein. An embodiment could let a developer make clusters or folds that specify private methods, for instance. In addition to the name per se of a method, grouping (through clustering and/or folding) can be performed in some embodiments on characteristics 132 the embodiment can deduce from the name, possibly by using side data. A side database could map a method to the person who wrote the method (source code control systems can do this), to allow clustering or other grouping by author.

In some embodiments, the system includes a performance analysis tool 212 residing in the memory and configured for execution with the logical processor 110. The performance analysis tool is also configured to produce modified stacks 366 in response to grouping expressions 202.

In some embodiments, a grouping expression 202, or an internal (to the system) representation of a grouping expression, may serve as a grouping specification. In some, the memory is further configured by a clustering-by-name grouping specification 370 which groups all nodes of a specified library 124 into a single group 236, and that group is present in the modified stack. In some, the memory is further configured by a clustering-by-name grouping specification 370 which groups all nodes by library except for the nodes of a specified library, and the specified groups are present in the modified stack. In some, the memory is further configured by an entry-group-clustering grouping specification 374 which groups all nodes of an operating system or other kernel 140 into a single group 236, and that group is present in the modified stack with an entry point name 224 identifying an operating system call made upon entry to the group.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a system, such that no human user 104 interacts directly with the embodiment. Software processes may be users 104.

In some embodiments, the system includes multiple computers connected by a network. Networking interface equipment can provide access to networks 108, using components such as a packet-switched network interface card, a wireless transceiver, or a telephone network interface, for example, will be present in a computer system. However, an embodiment may also communicate through direct memory access, removable nonvolatile media, or other information storage-retrieval and/or transmission approaches, or an embodiment in a computer system may operate without communicating with other computer systems.

Processes

Figure 3:
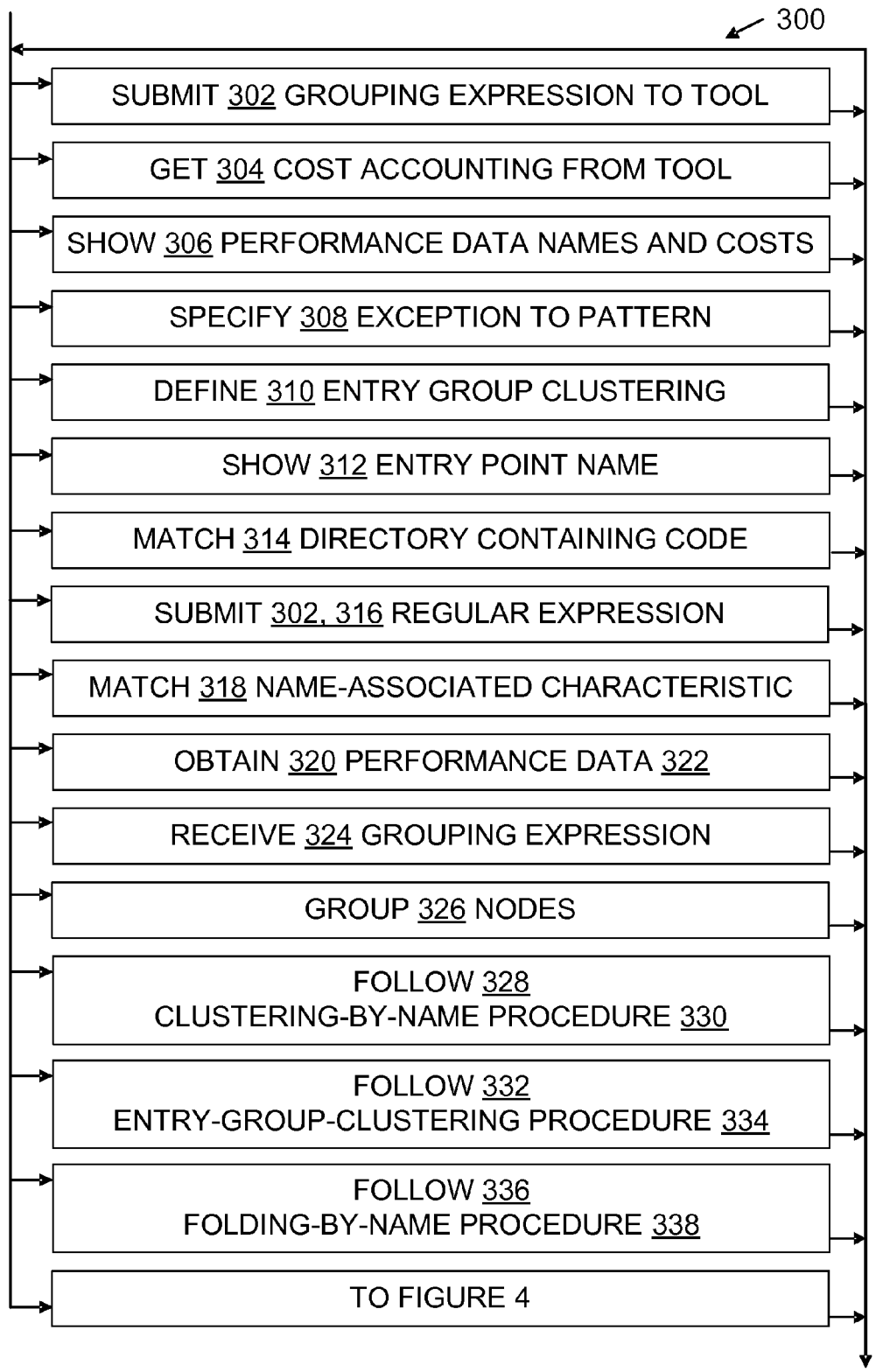
FIGS. 3 and 4 collectively provide a flow chart illustrating steps of some process and configured storage medium embodiments.
Figure 4:
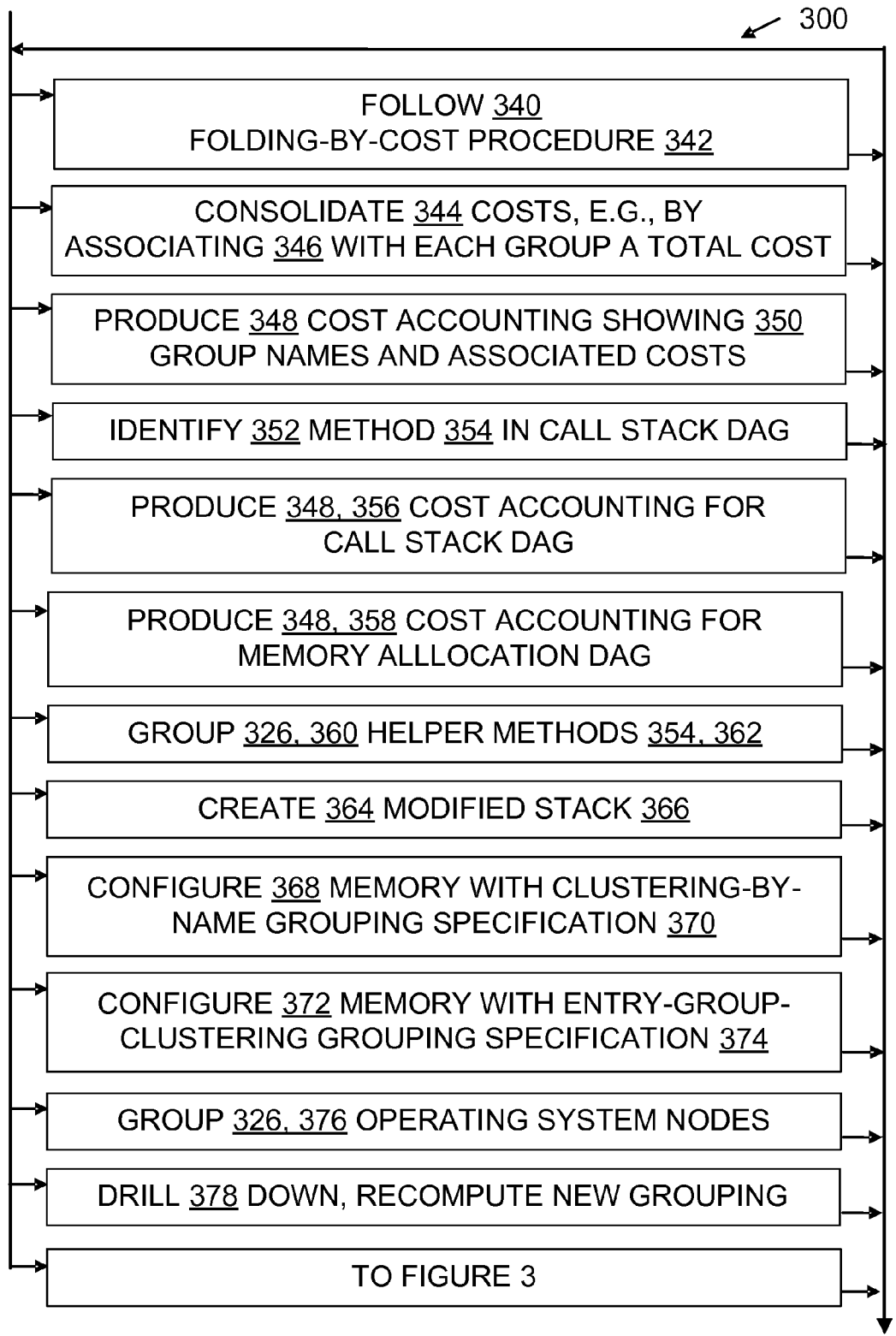

FIGS. 3 and 4 illustrate some process embodiments in a flowchart 300. Processes shown in the Figures may be performed in some embodiments automatically, e.g., by a performance analysis tool 212 under control of a script that feeds the tool grouping expressions and requires little or no other user input. Processes may also be performed in part automatically and in part manually unless otherwise indicated. In a given embodiment zero or more illustrated steps of a process may be repeated, perhaps with different parameters or data to operate on. Steps in an embodiment may also be done in a different order than the top-to-bottom order that is laid out in FIGS. 3 and 4. Steps may be performed serially, in a partially overlapping manner, or fully in parallel. The order in which flowchart 300 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Examples are provided herein to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein.

During a grouping expression submitting step 302, a developer or other user submits a grouping expression 202 to an embodiment. Step 302 may be accomplished using a command line or other textual interface, XML or other networked interface, graphical user interface (GUI), and/or other mechanism, for example. Some embodiments form groups by using predefined patterns, e.g., to select only the specified developer's code. Some embodiments form groups based on user gestures in a GUI, e.g., one might select a node shown in the GUI, then right-click a mouse and select "fold".

During a cost accounting getting step 304, a developer or other user gets a cost accounting 214 from an embodiment. Getting step 304 may be accomplished using any of the mechanisms used for submitting step 302, for example.

During a performance data showing step 306, an embodiment shows performance data names and costs. "Showing" is used broadly herein. Accordingly, showing step 306 may be accomplished using any of the mechanisms used for submitting step 302, for example.

During an exception specifying step 308, a developer or other user submits a grouping expression 202 to an embodiment, in which an exception 208 is included as part of the transformation. Exception specifying step 308 may be accomplished using any of the mechanisms used for grouping expression submitting step 302, for example.

During an entry group clustering defining step 310, a developer or other user submits a grouping expression 202 to an embodiment, in which an entry group cluster 226 is defined as part of the transformation. Defining step 310 may be accomplished using any of the mechanisms used for grouping expression submitting step 302, for example.

During an entry point name showing step 312, an embodiment shows an entry point name 224. Showing step 312 may be accomplished using any of the mechanisms used for submitting step 302, for example.

During a directory matching step 314, an embodiment matches a directory 130 containing code 120 to a pattern 204 of a submitted grouping expression 202. Step 314 may be accomplished using familiar file system, code tracking, lexical pattern matching, and related technologies, adapted to the context of step 314 as discussed herein.

During a regular expression submitting step 316, which is an example of grouping expression submitting step 302, a developer or other user submits a grouping expression 202 to an embodiment, in which a non-trivial regular expression 220 is included as part of the expression. Any regular expression discussed herein is assumed to be non-trivial unless expressly stated otherwise. A non-trivial regular expression is one which includes both literal and non-literal parts, e.g., "mylib.dll" is not a non-trivial regular expression but "*lib.dll" a non-trivial regular expression when the asterisk pattern-matches to any nonempty string. More complex elements, such as alternate elements, optional elements, repeating elements, and the like, are also familiar indications of non-trivial regular expressions. Regular expression submitting step 316 may be accomplished using any of the mechanisms used for grouping expression submitting step 302, for example.

During a name-associated characteristic matching step 318, an embodiment matches a name-associated characteristic 132 to a pattern 204 of a submitted grouping expression 202. Step 314 may be accomplished using familiar database and other structured queries, version control and other code tracking tools, lexical pattern matching, and related technologies, adapted to the context of step 318 as discussed herein.

During a performance data obtaining step 320, an embodiment obtains performance data, such as execution data samples 136 and/or sample stacks 138. Step 320 may be accomplished using file system accesses, network accesses, interprocess communication, and/or other familiar mechanisms adapted to the context of obtaining step 320 as discussed herein.

During a grouping expression receiving step 324, an embodiment receives a grouping expression 202. Receiving step 324 corresponds with submitting step 302, but occurs within the receiving system's point of view rather than the submitting developer's point of view. Receiving step 324 may be accomplished using any of the mechanisms used for submitting step 302, for example.

During a node grouping step 326, an embodiment groups nodes 232 as indicated by a grouping expression 202. Grouping step 326 may be accomplished using pattern matching, pointers, cost consolidation data structures and routines adapted from familiar profilers to perform as discussed herein, and/or other software mechanisms. Unprocessed, nodes in a memory graph are unconstrained, e.g., they can have cycles, and thus are not necessarily DAGs. They can be reduced to DAGs using familiar techniques, e.g., by removing all links that are not in a breadth first traversal of nodes. One can also collapse all cycles down to a single node, forming groups.

During a clustering-by-name procedure following step 328, an embodiment follows a clustering-by-name procedure 330 (discussed elsewhere herein) during node grouping step 326.

During an entry-group-clustering procedure following step 332, an embodiment follows an entry-group-clustering procedure 334 (discussed elsewhere herein) during node grouping step 326.

During a folding-by-name procedure following step 336, an embodiment follows a folding-by-name procedure 338 (discussed elsewhere herein) during node grouping step 326.

During a folding-by-cost procedure following step 340, an embodiment follows a folding-by-cost procedure 342 (discussed elsewhere herein) during node grouping step 326.

During a cost consolidating step 344, an embodiment consolidates costs as part of, or in conjunction with, grouping step 326. For example, an embodiment may consolidate 344 costs by associating 346 a total cost 240 with a group 236, the total cost being the sum (within developer-acceptable tolerances) of the individual costs 218 of the samples 136 that were/are being grouped 326. Consolidating step 344 may be accomplished using running totals and mechanisms used in grouping step 326, for example.

During a cost accounting producing step 348 an embodiment produces a cost accounting 214 which shows 350 group name(s) 238 and respective consolidated cost(s) 240. Accounting producing step 348 may include saving the accounting in a file, transmitting the accounting over a network connection, sending the accounting to another process, printing the accounting, and/or displaying the accounting in a GUI, for example.

During a method identifying step 352, an embodiment identifies a method 354 (or equivalently a function 122 or other routine) in a call stack DAG 228. Step 352 may be accomplished using the method name, address, stack frame, code offset or other code location, and/or other familiar mechanisms within the context discussed herein, for example.

During a call stack DAG cost accounting producing step 356, which is an example of producing step 348, an embodiment produces a cost accounting 214 which shows 350 group name(s) 238 and respective consolidated cost(s) 240 for data samples 136 that represent call stack 128 entries.

During a memory allocation DAG cost accounting producing step 358, which is an example of producing step 348, an embodiment produces a cost accounting 214 which shows 350 group name(s) 238 and respective consolidated cost(s) 240 for data samples 136 that represent memory 112 allocation performance data entries.

During a helper method grouping step 360, which is an example of grouping step 326, an embodiment groups helper methods 362 (or equivalently, nodes 232 or another representation of helper methods). Helper methods are examples of methods 354, but serve primarily to support a higher-level method. The categorization of a method as a helper method (or not) may be manually performed by developers and/or may be done automatically, e.g., by denoting all methods in a library module as helper methods, or by denoting all methods written by a specified developer as non-helper methods.

During a modified stack creating step 364, an embodiment creates a modified stack 266, namely, a modification of a sample stack 138 made in response to a grouping expression 202. Creating step 364 may include grouping 326 nodes, consolidating 344 costs, and/or other steps described herein which organize samples 136 for performance analysis.

During a memory configuring step 368, a memory medium 112 is configured by a clustering-by-name grouping specification 370, e.g., by virtue of that specification 370 residing in the medium 112.

During a memory configuring step 372, a memory medium 112 is configured by an entry-group-clustering grouping specification 374, e.g., by virtue of that specification 374 residing in the medium 112.

During an operating system node grouping step 376, which is an example of grouping step 326, an embodiment groups nodes 232 or another representation of methods of an operating system or other kernel 140.

During a drilling and grouping step 378, which is an example of grouping step 326, an embodiment drills down by taking a subset of samples of a group and then recomputes a new grouping for just those samples. Thus, one may drill down into a group shown in a cost accounting and then obtain a cost accounting result that is specific to the samples that were chosen by drilling down. For example, after the groups are formed and a specific area of interest is determined, particular samples can be separated from the rest of the profile, and then the process of grouping can be done again. Thus one can ungroup or group differently, since semantically relevant nodes are sometimes different at different levels of abstraction.

The foregoing steps and their interrelationships are discussed in greater detail below, in connection with various embodiments. Some embodiments provide a process for organizing program performance data in semantic groups. The performance data includes multiple samples 136, each of the multiple samples having at least one name and at least one associated cost. The process includes submitting 302 a grouping expression 202 to a performance analysis tool 212. The grouping expression is written in a transformation syntax language 210, and specifies a pattern 204 and a replacement 206 for grouping multiple performance data samples. The process also includes getting 304 from the performance analysis tool a cost accounting 214 in response to the submitting step. The cost accounting shows 306 names of the performance data samples and associated attributed costs 218, 240, with all of the names being consistent with the grouping expression. In one variation, the submitted grouping expression also specifies 308 an exception 208 to the pattern.

In some embodiments, the submitting step includes submitting 302 a grouping expression which defines 310 an entry group clustering 226, and the getting step includes getting 304 a cost accounting which shows at least one entry point name 224. In some embodiments, the submitted grouping expression pattern matches 314 at least one directory 130 containing program code 120. In some embodiments, the submitted 302, 316 grouping expression pattern includes a regular expression 220. In some embodiments, the submitted grouping expression pattern matches 318 a name-associated characteristic 132 of the performance data samples.

Some embodiments provide a process for organizing program performance data, in which the process includes obtaining 320 performance data which includes multiple samples. Each of the samples has a stack 138 of names which represent nodes 232 located in a directed acyclic graph (DAG), each of the nodes having an associated cost 218. The names in the sample stack 138 may be the method names in a call stack 128, for example.

This example process also includes receiving 324 a grouping expression (written in a transformation syntax language), which is intended to group 326 nodes and consolidate 344 costs by following a grouping procedure 234. For example, the process may follow 328 a clustering-by-name procedure 330, follow 332 an entry-group-clustering procedure 334, follow 336 a folding-by-name procedure 338, and/or follow 340 a folding-by-cost procedure 342.

This example process also includes grouping 326 nodes into at least one group as commanded in the grouping expression; consolidating 344 costs by associating 346 with each group 236 a total cost 240 which is the sum of the cost(s) 218 associated with individual node(s) 232 of the group; and producing 348 a cost accounting showing group name(s) and associated group costs after grouping the nodes and consolidating their costs.

In some embodiments, this process follows 328 the clustering-by-name procedure 330, namely, the process groups nodes into at least one group on the basis of node names and irrespective of node locations in the DAG.

In some embodiments, at least one group in the cost accounting 214 has a group name 238 that identifies a file system directory 130, and nodes which have code 120 residing in that directory are grouped into that group.

In some embodiments, this process follows 332 the entry-group-clustering procedure 334, namely, the process groups nodes into an entry group 236 on the basis of node names. An entry node 232 is a border node of the entry group nodes in the DAG, and the cost accounting shows the entry group name 238 together with the entry node name 224. In some embodiments using this or other processes, the entry node name 224 identifies a method 354 in a call stack DAG 228, namely, the method which was called upon entry to code that is represented by the entry group name. In some embodiments using this or other processes, the process produces 348, 358 a cost accounting 214 for a memory allocation DAG 230.

In some embodiments, this process follows 336 the folding-by-name procedure 338. That is, the process groups 326 nodes into a group represented by a remaining node 232 on the basis of the nodes being reachable in the DAG from the remaining node and on the basis of node names. In some cases, the remaining node represents a method 354 which invokes helper methods 362, and the process groups the helper methods and consolidates their cost with the cost of the remaining node.

In some embodiments, this process follows 340 the folding-by-cost procedure 342. That is, the process groups 326 nodes into a group represented by a remaining node on the basis of the nodes being reachable in the DAG from the remaining node and on the basis of node cost 218 being less than a specified threshold.

Configured Media

Some embodiments include a configured computer-readable storage medium 112. Medium 112 includes disks (magnetic, optical, or otherwise), RAM, EEPROMS or other ROMs, and/or other configurable memory storage devices, including in particular computer-readable media storage devices (as opposed to wires and other propagated signal media). The storage medium which is configured may be in particular a removable storage medium 114 such as a CD, DVD, or flash memory. A general-purpose memory, which may be removable or not, and may be volatile or not, can be configured into an embodiment using items such as grouping expressions 202, modified stacks 366, and/or entry group clusters 226, in the form of data 118 and instructions 116, read from a removable medium 114 and/or another source such as a network connection, to form a configured medium. The configured medium 112 is capable of causing a computer system to perform process steps for transforming data through grouping expressions in a transformation syntax language as disclosed herein. FIGS. 1 through 4 thus help illustrate configured storage media embodiments and process embodiments, as well as system and process embodiments. In particular, any of the process steps illustrated in FIG. 3 and/or FIG. 4, or otherwise taught herein, may be used to help configure a storage medium to form a configured medium embodiment.

Additional Examples

Additional details and design considerations are provided below. As with the other examples herein, the features described may be used individually and/or in combination, or not at all, in a given embodiment.

Those of skill will understand that implementation details may pertain to specific code, such as specific grouping expression 202 syntax and specific tools 212, and thus need not appear in every embodiment. Those of skill will also understand that program identifiers and some other terminology used in discussing details are implementation-specific and thus need not pertain to every embodiment. Nonetheless, although they are not necessarily required to be present here, these details are provided because they may help some readers by providing context and/or may illustrate a few of the many possible implementations of the technology discussed herein.

Additional Example Set One

For the sake of discussion, assume that input to a profiling viewer tool 212 is a series of samples 136. Assume each sample 136 has a number representing the cost 218 to be associated with the sample, and a stack 138 (e.g., a list of strings) that represents a hierarchical group to which this sample belongs. The strings may have components that represent other possible code elements, such as modules, packages, directories, and so on.

For example the stack:

[program.exe!Main.main, program.exe!Sorting.sort, library.dll!HelperClass.Helper, library.dll!HelperClass.privateMethod, os.dll!OSCall]

represents a sample that was taken when the 'main' method 354 in the class 'Main' in the executable file 'program.exe' had called the method 'sort' on the class 'Sorting' which in turn called the 'Helper' method from the executable file 'library.dll' which in turns calls a method 'privateMethod' which finally makes an operating system call OSCall (which lives in os.dll).

There are typically thousands of such samples for a software product under development or being upgraded or otherwise tested. Each of the samples can have different stacks. One possible goal is to aggregate the costs in ways that allow the programmer to understand the expense and eliminate unnecessary costs.

One first step is to allow the user to specify ways of grouping items in the stack. This can be done using a regular expression based search-and-substitute syntax. One way of doing this is using the syntax Pattern→Replacement In some embodiments, Pattern 204 and Replacement 206 are defined in Microsoft®.NET Regular Expressions documentation which is available online (Microsoft is a mark of Microsoft Corporation). This syntax allows a developer to write a grouping expression 202 such as (*.dll)!→$1 which matches any item that has dll! In its name and rewrites it to be the captured strings, e.g., library.dll!HelperClass.Helper→library.dll This grouping expression 202 has the effect of grouping all nodes 232 that are in library.dll and treating them as a single entity (a single group 236) for performance analysis purposes.

By using different patterns (and having enough information in the original string), a developer may do many interesting groupings in a very concise syntax. Some embodiments can use other transformation syntax languages, but regular expressions are used as examples here because they are powerful and easily understood.

In some situations, it may be helpful to have several such patterns, separated with ';' or another character, for example. Some embodiments also support the syntax Pattern→ which has the special meaning of 'do not match subsequent patterns' if the pattern matches. This syntax is useful to create exceptions 208 to a pattern.

For example, library.dll!→;(*.dll)→$1 will group all entries by DLL except for those entries from library.dll. This grouping expression will transform the call stack-based sample stack 138 above into:

[program.exe, program.exe, library.dll!HelperClass.Helper, library.dll!HelperClass.privateMethod, os.dll]

This grouping is appropriate for a developer of library.dll, who does not care at the moment about the details of how the library was called (methods in program.exe), or the details of operating system calls (os.dll).

In one possible next operation, adjacent duplicate entries in the stack 138 are removed. In the example above, the two nodes representing 'program.exe' can be merged, yielding:

[program.exe, library.dll!HelperClass.Helper, library.dll!HelperClass.privateMethod, os.dll]

This stack 138 can then be aggregated with some or all of the other stacks from the samples 136. Familiar viewing techniques may be applied to the modified stack 366. One may utilize a tree view, for example, which groups samples that have exactly the same stack (exclusive) or stack prefix (inclusive). One may also or alternately utilize a by-name view which groups all samples that have the name for the last entry in the stack (exclusive), or have the name anywhere in the stack (inclusive). One may also or alternately utilize a caller-callee view, which is like a by-name view but also keeps track of the nodes that directly call the name or are called by the name.

The above example demonstrates relatively simple grouping. Many profilers have a 'module' view, which is a simple group by DLL name. By generalizing this to a pattern, more powerful options are provided to developers. If the name in the stack includes the full file name path of the DLL, one can also group by the directory (or directory prefix), of the DLL. This can be used in some systems, for example, to quickly indicate that you wish to group all modules associated with the operating system (which all live in a particular directory), as a single group.

With regard to Entry Groups, it may occur that more detail than desired is lost through simple grouping. One refinement of groups, available through some embodiments, is the entry point 222 group 236. Different grouping expression 202 syntax may be used to distinguish entry group clustering from simple groups. Here, the =>syntax is used instead of →, as in Pattern=>Replacement In some embodiments, entry groups work like simple groups in that they transform entries in the stack to new names. However, unlike simple groups the original name is not lost. Thus, the pattern (*.dll)=>$1 will form the stack 366

[program.exe, program.exe, library.dll, library.dll, os.dll]

but it will also keep the original stack

[program.exe!Main.main, program.exe!Sorting.sort, library.dll!HelperClass.Helper, library.dll!HelperClass.privateMethod, os.dll!OSCall]

In some embodiments, at this point in the creation 364 of a modified stack 366, the stack above is scanned from root to leaf, and the embodiment notes each transition from group to group. There are two transitions in this example, from program.exe to library.dll, and from library.dll to os.dll. At those transition points, a new group that includes the group name as well as the name of the ungrouped item is formed (that is at the entry point into the group).

Here we use the syntax

Group <entry Name> to denote the new group. Once the group is entered by the flow of control, however, as long as entries stay in the group they become part of the entry point group. Thus the result in this example is:

[program.exe <program.exe!Main.main>, program.exe <program.exe!Main.main>, library.dll <library.dll!HelperClass.Helper>, library.dll <library.dll!HelperClass.Helper>, os.dll <os.dll!OSCall>]

Once again adjacent duplicated entries are removed, yielding:

[program.exe <program.exe!Main.main>, library.dll <library.dll!HelperClass.Helper>, os.dll <os.dll!OSCall>]

Entry-group-clustering can be helpful because it shows 312 how control flow entered code that is relatively uninteresting, but still hides the rest of the details of what is inside that relatively uninteresting code 120. Because only public methods of a library can be called from another executable, entry point groups will tend in many systems to remove private functions from the stack. If the name included whether the name was public or private, one could also achieve this result by using the folding feature discussed below.

With regard to folding by name, clustering groups names by something that can be determined by just looking at the name of the node. Folding groups things by their relationship in the stack. A basic idea of folding is that some nodes are uninteresting (such as helper methods), and the user does not wish to see them. One mechanism to do this is to remove the node from the stack, and assign the removed node's cost to its caller.

To specify folding in one embodiment, the developer only specify a list of patterns to match. For example, He*er will fold any name that matches the pattern above. As mentioned, these are removed from the stack and their costs are consolidated.

With regard to folding by cost, folding by name can be useful to avoid particular names, but it is also sometimes useful to ignore any entry that has a small enough cost that it is considered insignificant. For instance, nodes less than 1% of the total cost, or another specified threshold, may be considered insignificant.

In some embodiments, after clustering and folding the samples are aggregated by stack (all samples with exactly the same stack are combined). The total cost of all samples is also computed. At this point any stacks that are less than the threshold (say 1%) are identified. The leaf nodes of these stacks are then truncated (folding away the leaf), which produces a new stack. The samples are now accumulated into the new stack, which will typically be combined with surviving aggregated nodes.

In some embodiments, the effects of folding are available not merely as they were, familiar in call tree views (by removing nodes from the tree), but more powerfully also in caller-callee and by-name views. In particular, folding away small nodes can be very helpful in a by-name view.

With regard to analyzing graphs for memory heaps, the techniques described above may be tailored to a set of samples each of which has a call stack 128. However, some embodiments also or alternately can be used to visualize other structures, such as directed-acyclic graph (DAG) or a cyclic graph that has been reduced to a DAG. This may be useful for visualizing memory use in a heap, for example.

One process for mapping to support such performance analysis of memory usage proceeds as follows. If the data has cycles (a general graph), these are discovered and each cycle is considered a single node. Within the cycle a spanning tree is formed. Each node in each cycle is marked with an identifier that identifies it as a member of the group. Thus, grouping patterns as described above can be used to further group the nodes as the user sees fit. The result of the foregoing is a directed acyclic graph. At this point each node can be assigned a weight which is the count of the number of incoming arcs to the node. The cost of the node distributed among each of the incoming arcs. One way of doing this is to distribute it evenly. Another way is to allow the user to specify that some arcs should be weighted more than others (for example, that some arcs are 'weak' and should not be assigned the cost, or that one arc is the 'owner' and should be assigned all the cost).

Now a list can be formed for each node; the list represents the path from the root to the node. Thus we can form a list of samples 136 with a cost (the original cost for the node weighted by the weight assigned the arc into that node). This can then be fed into the grouping procedures 234 and other process steps already discussed. This weighting has the property that the aggregate cost 240 assigned to the root node 232 is exactly the sum of all the costs 218 of the nodes in the graph 230. Thus the whole graph has been aggregated in a way that can leverage all the techniques that were used for stack-based data.

Additional Example Set Two

The following discussion is derived from PerfView documentation. PerfView is a program implemented by Microsoft® Corporation. Aspects of the PerfView program and/or documentation are consistent with or otherwise illustrate aspects of the embodiments described herein. However, it will be understood that PerfView documentation and/or implementation choices do not necessarily constrain the scope of such embodiments, and likewise that PerfView and/or its documentation may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Perfview is a tool for quickly and easily collecting and viewing performance data. It is based on the Event Tracing for Windows (ETW) feature of the operating system which can collect information machine wide about a variety of useful events. It is the powerful technology that the Windows performance group uses to track and understand the performance of Microsoft®Windows code, and the basis for their Xperf tool. Perfview can be thought of as a relative of that tool. PerfView also has the ability to use symbolic information associated with Microsoft®.NET Runtime code, making PerfView ideal for managed code investigations.

PerfView was designed to be easy to deploy and use. To deploy PerfView simply copy the PerfView.exe to the computer you wish to use it on. No additional files or installation step is needed. PerfView features are 'self-discoverable'. The initial display is a 'quick start' guide that leads you through collecting and viewing your first set of profile data in a literally a minute or two. Hovering the mouse over most GUI controls will give you short explanations. PerfView is 'right click enabled' which means that if you want to manipulate data in some way, right clicking on it is likely to show you the operations PerfView provides.

One of the more useful events (and one that is turned on by default) is the 'profile' sampling event. This event samples the instruction pointer of each of the machine's CPUs every millisecond. Each sample captures the complete call stack of the thread current executing, giving very detailed and useful information about what that thread was doing at both high and low levels of abstraction. PerfView aggregates these stack traces and presents them in a stack viewer that has powerful grouping operations that make understanding this data significantly simpler than most profilers.

PerfView starts you with the 'ByName view' for doing a bottom-up analysis. In this view you see every method that was involved in a sample (either a sample occurred in the method, or the method called a routine that had a sample). Samples are sorted 'by name'. Samples can either be exclusive (occurred in within that method), or inclusive (occurred in that method or any method that method called). By default the 'by name' view sorts methods based on their exclusive time and shows you the 'hottest' methods in your program.

Typically the problem with a 'bottom-up' approach is that the 'hot' methods in your program (a) are not very hot (use <5% of CPU), and/or (b) tend to be 'helper' routines (either in your program or in libraries or the runtime), that are used 'everywhere' and are already well tuned. In both cases, you don't want to see these helper routines, but rather the lowest 'semantically interesting' routine. This is where PerfView's powerful grouping features come into play.

By default PerfView groups samples by clustering and/or folding. Clustering can involve using the GroupPats 'Just my code' pattern to form two groups. The first group is any method in any module that is in the same directory (recursively) as the 'exe' itself. This is the 'my code' group and these samples are left alone. Any sample that is not in that first group is in the 'EXTERNAL' group. These samples are groups according to the method that was called to enter the group. Folding can involve using the Fold % feature. This is set to 1, which means that any method that has fewer than 1% of the samples (inclusively) is not 'interesting' and should not be shown. Instead its samples are folded (inlined), into its caller.

For example, the top line in one ByName view is "EXTERNAL <<mscorlib!System.DateTime.get_Now( )>>". This is an example of an 'entry group'. 'EXTERNAL' is the group's name 238 and the entry point name 224 mscorlib!System.DateTime.get_Now( ) is the method that was called that entered the group. From that point on any methods that get_Now( ) calls are not shown, but rather their time is simply accumulated into this node. Effectively this grouping says 'I don't want to see the internal workings of functions that are not my code, but I do want see public methods I used to call that code.

Another feature that helps 'clean up' the bottom-up view is the Fold % feature. This feature will cause all 'small' call tree nodes (less than the given %) to be automatically folded into their parent. With that feature off, you will often see many more entries that have 'small' amounts of time. These small entries again tend to just add 'clutter' and make investigation harder.

In one example we see that 'DateTime.get_Now( )' is the 'hot' method (74.6% of all samples). However we also note that the view has groups <ntdll!?> and <ntoskrln!?> which are two important operating system DLLs that take up 9.5% and 2% of the CPU. We could resolve the symbols for these DLLs so that we have meaningful names. Alternately, we could fold these entries away, e.g., by adding the pattern '!?'. This pattern says to fold away any nodes that don't have a method name. This leaves us with very 'clean' function view that has only semantically relevant nodes in it.

More generally, the first phase of a performance investigation can be forming a 'perf model' and assigning times to semantically relevant nodes (things the programmer understands and can do something about). We do that by either forming a semantically interesting group and assigning nodes to it, or by folding the node into an existing semantically relevant group, leveraging entry points into large groups (modules and classes) as handy 'pre made' semantically relevant nodes.

One of the nodes that is left is a node called 'BROKEN'. This is a special node that represents samples whose stack traces were determined to be incomplete and therefore cannot be attributed properly. As long as this number is small (< a few %) then it can simply be ignored.

PerfView displays both the inclusive and exclusive time as both a metric (msec) as well as a % because both are useful. The percentage gives you a good idea of the relative cost of the node 232, however the absolute value is useful because it very clearly represents 'clock time' (e.g. 300 samples represent 300 msec of CPU time). The absolute value is also useful because when the value gets significantly less than 10 it becomes unreliable; when you have only a handful of samples they might have happened 'by pure chance' and thus should not be relied upon.

In one example, the bottom up view did an excellent job of determining that the get_Now( )method as well as the 'SpinForASecond' consume the largest amount of time and thus are worth looking at closely. However it can also be useful to understand where CPU time was consumed from the top down. This is what the callTree view is for. Simply by clicking the 'CallTree' tab of the stack viewer will bring you to that view. Initially the display only shows the root node, but you can open the node by clicking on the check box.

In PerfView, as in some embodiments discussed elsewhere herein, all of the filtering and grouping parameters at the top of the view affect any of the views (byname, caller-callee or calltree), equally. We can use this fact and the 'Fold %' functionality to get an even coarser view of the 'top' of the call tree. With all nodes expanded, simply right click on the window and select 'Increase Fold %' (or easier hit the F7 key). This increases the number it the Fold % textBox by 1.6×. By hitting the F7 key repeatedly you keep trimming down the 'bottoms' of the stacks until you only see only the methods that use a large amount of CPU time.

Getting a coarse view of the tree is useful but sometimes you want to restrict your attention to what is happening at a single node. For example, if the inclusive time for BROKEN stacks is large, I might want to view the nodes under 'BROKEN' stacks to get an idea what samples are 'missing' from their proper position in the call tree. I can do this easily by viewing the BROKEN node in the Caller-callee view. The easiest way of entering this view is to Double-Click on a node in any view. Doing this shows BROKEN in the Caller-Callee view.

While groups are a very powerful feature for understanding the performance of your program at a 'coarse' level, you may wish to 'Drill into' those groups and understand the details of PARTICULAR nodes in detail. This is what the 'Drill Into' command is for. In one example, if we go back to the 'ByName' view and select the 3792 samples 'Inc' column of the 'get_Now' right click, and select 'Drill Into', it brings up a new window where only those 3792 samples have been extracted from the all the samples and placed in this sub-view. However Drilling in does not change any filter/grouping parameters. We now ungroup the nodes that were grouped into 'mscorlib!DateTime.get_Now( ). To do this we select the 'mscorlib!DateTime.get_Now( ) node, right click, and select 'Ungroup Module'. This indicates that we wish to ungroup any methods that were in the 'mscorlib' module. This allows us to see the 'inner structure' of that routine (without ungrouping completely). Because the 'Drill Into' window is separate from its parent, you can treat is as 'disposable' and simply discard it when you are finished looking at aspect of your program's performance.

In the example above we drilled into the inclusive samples of method. However you can also do the same thing to drill into exclusive samples. This is useful when user callbacks or virtual functions are involved. Take for example a 'sort' routine that has internal helper functions. In that case it can be useful to segregate those samples that were part of the nodes 'internal helpers' (which would be folded up as exclusive samples of 'sort') from those that were caused by the user 'compare' function (which would typically not be grouped as exclusive samples because it crossed a module boundary). By drilling into the exclusive samples of 'sort' and then ungrouping, you get to see just those samples in 'sort' that were not part of the user callback. This may be exactly what the programmer responsible for the 'sort' routine would want to see.

Familiar methods of collecting performance data can be used. In some systems a File→Run (Alt-R) menu item, prompts for a data file name to create and a command to run. The command turns on profiling, runs the command, and then turns profiling off. The resulting file is then display in the stack viewer. Alternately, a File→Collect (Alt-C) menu item only prompts for a data file name to create. This command turns on profiling, and then displays a dialog box to turn off profiling. You are then free to interact with machine in any way necessary to capture the activity of interest; profiling is machine wide. Once you have reproduced the problem, you can dismiss the dialog box to stop profiling and proceed to analyze the data.

One of the goals of PerfView is for the interface to remain responsive at all times. A manifestation of this is the status bar at the bottom of most windows. This bar displays a one line output area as well as an indication of whether an operation is in flight, a 'Cancel' button and a 'Log' button. When complex operations are performed (like taking a trace or opening a trace for the first time), detailed diagnostic information is also collected and stored in a Status log.

Because samples are taken every millisecond per processor in PerfView, each sample represents 1 millisecond of CPU time. However exactly where the sample is taken is effectively 'random', and so it is really 'unfair' to 'charge' the full millisecond to the routine that happened to be running at the time the sample was taken. It is also true that as more samples are taken this 'unfairness' decreases as the square root of the number of samples. Even with thousands of samples, there is still 'noise' that amounts to at least 3%. This error gets larger as the methods/groups being investigated have fewer samples. Increasing the number of samples will help, however you should keep in mind the sampling error when comparing small differences between two traces.

Because a stack trace is collected for each sample, every node has both an exclusive metric (the number of samples that were collected in that particular method) and an inclusive metric (the number of samples that collected in that method or any method that that method called). Typically you are interested in inclusive time, however it is important to realize that folding and clustering may artificially increase exclusive time (it is the time in that method (group) and anything folded into that group). When you wish to see the internals of what was folded into a node, you can Drill Into the groups to open a view where the grouping or folding can be undone.

A default stack viewer in PerfView analyzes CPU usage of your process. There are three things that you should do immediately when starting a CPU analysis of a particular process in PerfView. First, determine that you have at least a few 1000 samples (preferably over 5000). Second, determine that the process is actually CPU bound over the time of interest. Third, ensure that you have the symbolic information you need.

Performance investigations can either be 'top-down' (starting with the Main program and how the time spent there is divided into methods it calls), or 'bottom-up' (starting with methods at 'leaf' methods where samples were actually taken, and look for methods that used a lot of time). Both techniques are useful, however 'bottom-up' is usually a better way to start because methods at the bottom tend to be simpler and thus easier to understand and have intuition about how much CPU they should be using.

PerfView starts you out in the 'ByName' view that is an appropriate starting point for a bottom-up analysis. It is helpful in a bottom up analysis to group methods into semantically relevant groupings. By default PerfView picks a good set starting group (called 'just my code'). In this grouping any method in any module that lives in a directory other than the directory where the EXE lives, is considered 'EXTERNAL' and the entry group feature is used to group them by the method used to call out to this external code. You know that you have a 'good' set of groupings when what you see in the 'ByName' view are method names that are semantically relevant (you recognize the names, and know what their semantic purpose is), there are not too many of them (e.g., less than twenty or so that have an interesting amount of exclusive time), but enough to break the program into 'interesting' pieces that you can focus on in turn (by Drilling Into).

One way of doing this is to increase the Fold %, which folds away small nodes. While this is fast and easy, it does not pay attention to how semantically relevant the resulting groups are. As a result it may group things in poor ways (folding away small nodes that were semantically relevant, and grouping them into 'helper routines' that you don't much want to see). Typically the best results occur when you use Fold % in the 1-10% range (to get rid of the smallest nodes), and then selectively fold way any semantically uninteresting nodes that are left. This can be done by looking at the 'ByName' view, holding the 'Shift' key down, and selecting every node on the graph that has some exclusive time (they will be toward the top), and you don't recognize. After you have completed your scan, simply right click and select 'Fold Item' and these nodes will be folded into their caller, disappearing from the view. Repeat this until there are no nodes in the display that use exclusive time that are semantically irrelevant.

During the first phase of an investigation you spend your time forming semantically relevant groups so you can understand the 'bigger picture' of how the time spent in hundreds of individual methods can be assigned a 'meaning'. Typically the next phase is to 'Drill into' one of these groups that seems to be using too much time. In this phase you are selectively ungrouping a semantic group to understand what is happening at the next 'lower level' of abstraction.

The PerfView stack viewer is the main PerfView window for doing performance analysis. The stack viewer has three main views: ByName, Caller-Callee, and CallTree. Regardless of what view is selected, the samples under consideration and the grouping of those samples are the same for every view. This filtering and grouping is controlled by the text boxes at the top of the view and are described in detail elsewhere herein. In addition to the grouping/filtering textboxes, the stack viewer also has a find textbox, which allows you to search (using .NET Regular expressions) for nodes 232 with particular names 216.

The columns displayed in the stack viewer grids are independent of the view displayed. Columns can be reordered simply by dragging the column headers to the location you wish, and most columns can be sorted by clicking on an (often invisible) button in the column header directly to the right of the column header text. The columns that are displayed in a cost accounting 214 are discussed below.

Name. Each frame on the stack is given a name. It starts out as a name of the form module!fullMethodName but may be transformed by grouping 326. There might also be a suffix of the form [N-M frames]. This is used in the callTree view whenever a node has only one child, which is itself. In this case there is no interesting information in chain of calls and so they are combined into a single node, however the node is annotated with the minimum and maximum number of frames that were combined for any particular call stack to show that this transformation happened. This combining occurs most frequently when the frame name is a group.

Exc. The amount of cost (msec of CPU time) that can be attributed to the particular method itself (not any of its callees). Note that this does include any cost that was folded into this node because of FoldPats or Fold % specifications. One can sort by this column's value.

Exc %. The exclusive cost expressed as a percentage of the total cost of all samples; sortable (one can sort by it).

Exc Ct. The count of samples (instances) that are associated with just this entry (not its children). Note that this does include any instances included because of FoldPats or Fold % specifications. Sortable.

Inc. The cost associated with this node as well as all its children (callees) recursively. The inclusive cost of the ROOT contains all costs. Sortable.

Inc %. The inclusive cost expressed as a percentage of the total cost of all samples (will be 100% for the ROOT node). Sortable.

Inc Ct. The count of samples (instances) that are associated with this entry or any of children (callees) recursively. Sortable.

When. This is a visualization of how the INCLUSIVE CPU samples collected for that node vary over time.

First. This is the time (in msec from the beginning of the trace) of the first inclusive sample associated with this name. Sortable.

Last. This is the time (in msec from the beginning of the trace) of the last inclusive sample associated with this name. Sortable.

ByName View (Group by Method). The default view for the stack viewer is the ByName View. In this view every node (method or group) is displayed, shorted by the total EXCLUSIVE time for that node. This is the view you would use for a bottom up analysis. Double clicking an entry will send you to the Caller-Callee View for the selected node.

CallTree View. The call tree view shows how each method calls other methods and how many samples are associated with each of these called, starting at the root. It is an appropriate view for doing a top down analysis. Each node has a checkbox associated with it that displays all the children of that node when checked. By checking boxes you can drill down into particular methods and thus discover how any particular call contributes to the overall CPU time used by the process. Like all PerfView stack-viewer views, the grouping/filtering parameters are applied before the calltree is formed.

Caller Callee View. The caller-calllee view is designed to allow you to focus on the resource consumption of a single method. Typically you navigate to here by navigating from either the ByName or Calltree view by double-clicking on a node name. If you have a particular method you are interested in, search for it (find textbox) in the ByName view and then double click on the entry.

The ByName view has the concept of the 'Current Node'. This is the node of interest and is the grid line in the center of the display. The display then shows all nodes (methods or groups) that were called by that current node in the lower grid and all nodes that called the current node in the upper pane. By double clicking on nodes in either the upper or lower pane you can change the current node to a new one, and in that way navigate up and down the call tree. Unlike the CallTree view, however, a node in the Caller-Callee view represents all calls of the current node. Realize that as you double click on different nodes to make the node current, the set of samples changes. This can be confusing if you are not aware it is happening.

Sometimes you wish to view all the ways you can get to the root from a particular node. You can't do this using the caller-callee view directly because of the issue of changing sample sets. You can simply search for the node in the callTree view, however it will not sort the paths by weight, which makes finding the 'most important' path more difficult. You can however select the current node, right click and select 'Include Item'. This will cause all samples that do not include the current node to be filtered away. This should not change the current caller-callee view because that view already only considered nodes that included the current node. Now however as you make other nodes current, they too will be only consider nodes that include the original node as well as the new current node. By clicking on caller nodes you can trace a path back to the root.

Because the caller-callee view aggregates all samples which have the current node anywhere in its call stack there is a potential problem with recursive functions. If a single method occurs multiple times on the stack a naive approach would count the same single sample multiple times (once for each instance on the call stack), leading to erroneous results. You can solve the double-counting problem by only counting the sample for the first (or last) instance on the stack, but this skews the caller-callee view (it will look like the recursive function never calls itself, which is also inaccurate). The solution that PerfView chooses is to 'split' the sample. If a function occurs N times on the stack than each instance is given a sample size of 1/N. Thus the sample is not double-counted but it also shows all callers and callees in a reasonable way.

Symbol Resolution. At sample collection time, when a CPU sample or a stack trace is taken, it is represented by an address in memory. This memory address is converted to symbolic form to be useful for analysis. This happens in two steps. First determine if the code belongs to a particular DLL (module) or not. Second, given the DLL, look up detailed symbolic information. If the first step fails (uncommon), then the address is given the symbolic name ?!? (unknown module and method). However if the second step fails (more common) then you can at least know the module and the address is given the symbolic name 'module!?'.

?!? Methods. Code that does not belong to any DLL was apparently dynamically generated. There are a number of 'anonymous' helper methods that are generated by the runtime, and since these have no name, there is not much to do except leave them as ?!?. These helpers typically are uninteresting (they don't have much exclusive time), and can be folded into their caller during analysis (add ?!? to the FoldPats textbox). They typically happen at the boundary of managed and unmanaged code.

More generally, familiar tools and techniques can be used to help resolve symbols in performance data. Like many diagnostic tools, PerfView uses an environment variable for a list of places to look for symbol files.

We now look at grouping expressions 202 and grouping 326 options in additional detail. As to Simplified Pattern matching, the syntax for normal .NET regular expressions is not the most convenient for matching patterns for method names. In particular the '.', '\' '(' ')' and even '+' and '?' are used in method or file names and would need to be escaped (or users may forget they need to escape them, and get misleading results). As a result, PerfView uses a simplified set of syntactic patterns in a transformation syntax language that avoids these collisions. The syntactic patterns are as follows.

*—Represents any number of any character (like .NET .*). This is not unlike what * means in Windows command line.

%—Represents any number of any alpha-numeric characters (like .NET \w*).

^—Matches the beginning of the pattern (like .NET ^).

{ }—Forms groups for pattern replacement (like .NET ( )).

This simplified pattern matching is used in the GroupPats, FoldPats, IncPats, and ExcPats text boxes. However it is not used in the 'Find' box; for that true .NET regular expressions are used.

As to Grouping (The GroupPats TextBox), what is collected by the PerfView profiler is a sequence of stacks. A stack is collected every millisecond for each hardware processor on the machine. This is wonderfully detailed information, but it is very easy to be not see the 'forest' (e.g., the semantic component consuming an unreasonable amount of time) because of the 'trees' (e.g., the data on hundreds or even thousands of 'helper' methods that are used by many different components). One way to tame this complexity is to group methods into semantic groups.

In this example, every sample 136 includes a list of stack frames, each of which has a name associated with it. Initially a name looks something like this: C:\Windows\Microsoft.NET\Framework\v2.0.50727\mscorwks!Assembly::Execute MainMethod. In particular the name contains the full path of the DLL that contains the method (however, the file name suffix has been removed), followed by a '!' followed by the full name (including namespace and signature) of the method. By default PerfView removes the directory path from the name and uses that to display. However, you can instead ask PerfView to group together methods that match a particular pattern. There are different ways of doing this:

PAT→GROUPNAME. Replace any frame names matching PAT with the text GROUPNAME.

PAT=>GROUPNAME. Like PAT→GROUPNAME but remember the 'entry point' into the group.

The first form is perhaps the easiest to understand. It does a search and substitute on all the frame names 216. Any frame that matches the given pattern, will be replaced (in its entirety) with GROUPNAME. This has the effect of creating groups 236 (all methods that match a particular pattern 204). For example, the specification "mscorlib!Assembly::→class Assembly" will match any frames that have mscorlib!Assembly::and replace the entire frame name (not just the part the matched) with the string 'class Assembly'. This has the effect of grouping 326 all methods from the class Assembly into a single group. With one command you can group together all methods from a particular class.

Like .NET regular expressions, PerfView regular expressions 220 allow you to 'capture' parts of the string match the pattern and use it in forming the group name 238. By surrounding parts of the pattern with { } you capture that part of the pattern, and then you can reference the string that matched that part of the pattern by using $1, $2, ... to signify the first, second, ... capture. For example: "{%}!→module $1" says to match any frame that has alphanumeric characters before !, and to capture those alphanumeric characters into a $1 variable. Whatever was matched is then used to form a group name. This has the effect of grouping all samples by the module that contained them (a 'module level view').

It can be useful to have more than one group specification, so grouping expression 202 syntax in PerfView supports a semicolon list of grouping commands. For example, here is another useful one:

{%!*}. % (→class $1;{%!*}::→class $1

There are two patterns in this specification. The first one captures the text right before the ! as well as up to the last '.' before a (. This captures the 'class and namespace' part of a .NET style method name. The second pattern does something similar with C++ style names that use :: to separate class name from method name. Thus the specification above groups methods by class.

Another technique is take advantage of the fact that the full path name of a module is matched, to group even more broadly than module. For example because * matches any number of any character, the expression 202 "system32\*!→OS" will have the effect of grouping any methods that came from any module that has system32 as any part of its module's path as 'OS'. This is convenient when people don't want to see any of the details of methods internal to the operation system, because it groups them together.

As to grouping precedence and exclusion groups, when a frame is matched against groups in PerfView, it is done in the order of the group patterns. Once a match occurs, no further processing of the group pattern is done for that frame (first one wins). Moreover, if the GROUPNAME is omitted, it means 'do no transformation'. These two behaviors can be combined to force certain methods to NOT be in a group. For example, the specification:

myDirectory\*!→;{%}!→module $1 will force a module level view for all modules, however because of the first pattern, any modules that have 'myDirectory' in their path are NOT grouped; they are excluded. This can be used to create a 'just my code' effect. Functions of every module except the code that lives under 'myDirectory' is grouped together.

Now consider Entry Groups. Many examples so far are 'simple groups'. A disadvantage of such simple groups is that you lose track of information about how you 'entered' the group. Consider the example of grouping all modules in System32 into a group called OS that was considered before. This works well, but has limitations. You might see that a particular function 'Foo' calls into the OS and that whatever it did in the OS takes a lot of time. Now it may be possible simply by looking at the body of 'Foo' to guess what OS function was being called, but this can be inconvenient. The data collected knows exactly which OS function was entered; it is the grouping choice which stripped that information. This is a situation entry groups can help remedy.

Syntax for entry groups resembles other groups but uses the => instead of → to indicate they are entry groups. An entry group clustering creates the same group as a normal group but it instructs the parsing logic to take the caller into account. Effectively a group is formed for each entry point 222 into the group. If a call is made from outside the group to inside the group, the name of the entry point is used as the name of the group. As long as that method calls other methods within the group, the stack frame is marked as being in the group. Thus boundary methods are left alone (they form another group), but internal methods (methods that call within the group), are assigned to whatever entry point group called it.

This fits nicely into a notion of modularity. While grouping all functions within the OS as a group is reasonable in some cases, it is also reasonable to group them by public surface areas (a group for every entry point into the OS). This is one thing entry groups can help do. Thus the grouping expression "system32\*!=>OS" will fold away all OS functions, keeping just their entry points in the lists.

As to Group Descriptions (comments), groups can be a powerful feature, but often the semantic usefulness of a group is not clear simply by looking at the pattern definition. Because of this groups are allowed in PerfView to have a description that precedes the actual group pattern. This description is enclosed in square brackets [ ]. PerfView ignores these descriptions; however they can be useful for humans to look at to understand the developer's intent behind the pattern.

As to folding (inlining), consider first folding by name (FoldPats TextBox). It is not uncommon that a particular helper method will show up 'hot' in a profile. You have looked at this helper method and it is as efficient as it can be made. Thus it is no longer interesting to see this method in the profile. You would prefer that this method was 'inlined' into each of its callers so that they get charged for the cost (rather than it showing up in the helper). This is what folding does.

The 'FoldPats' text box holds a semicolon list of patterns to fold away. Thus the pattern "MyHelperFunction" will remove MyHelperFunction from the trace, moving its time into whoever called it (as exclusive time). It has effect of 'inlining' MyHelperFunction' into all callers.

In PerfView, grouping transformations occur before folding (or filtering), so you can use the names of groups to specify folding. Thus the expression "OS" will fold way all OS functions (into their parents) all in one simple command.

Folding away small nodes (The Fold % TextBox). While folding away particular method calls is useful, it is often the case that you also are not interested in looking at helpers that don't consume a lot of time in the trace (you want to concentrate on the expensive method). There tend to be many methods, none of which individually use a lot of time, but which in total consume a lot of time. What you want to do is to eliminate this 'noise' by folding away all methods that don't consume a lot of time. This is one thing Fold % can do. Any method that consumes less than that % of the total time is folded into its parent (recursively). This typically cleans up the trace a lot, and makes it much easier to understand the trace.

Filtering is also support in PerfView. Consider Filtering Stacks with Particular Frames (The ExcPats TextBox). Grouping and folding have the attribute that they do not alter the total sample count in the trace. Samples are not removed, they are simply renamed or assigned to another node. It is also useful at times to exclude nodes altogether. In fact almost every PerfView trace uses filtering because usually you only care about one process, however the samples collected by PerfView are for the entire system. Thus you typically want to only consider those samples that are in the process of interest. This is one thing filtering can do.

Additional Example Set Three

The following discussion is derived from PerfConsole documentation. PerfConsole is a program implemented in different versions by Microsoft® Corporation. Aspects of some version(s) of the PerfConsole program and/or documentation are consistent with or otherwise illustrate aspects of the embodiments described herein. However, it will be understood that PerfConsole documentation and/or implementation choices do not necessarily constrain the scope of such embodiments, and likewise that PerfConsole may well contain features that lie outside the scope of such embodiments. It will also be understood that the discussion below is provided in part as an aid to readers who are not necessarily of ordinary skill in the art, and thus may contain and/or omit details whose recitation below is not strictly required to support the present disclosure.

Frequently when looking at calltrees there are many methods which are not directly related to the code that you control. It's helpful to hide these initially to get an understanding of the overall system. Folding allows you to do this by merging a set of similar nodes in a calltree into their caller. For instance, if you don't care about code in mscorlib you could say: 'fold module mscorlib*', and then in your calltree you would no longer see nodes from mscorlib. Instead all nodes that called into mscorlib would get a bit fatter (higher exclusive time).

Folding is also allowed on Types and Forwarders. For Types and Modules the input to the fold command is a match string which currently supports * as the wildcard character, e.g.: *corlib* or mscor* of *.dll. Additionally multiple match strings can be specified using a comma as a separator. For Forwarders the input is a threshold for folding which defaults to zero. Folding forwarders will fold all the nodes which are under the given threshold and not places where the tree branches into their caller. This can help eliminate noise where there is a long call chain that gets to something of interest at the end.

Note that folding can become very interesting when combined with the 'toprofile' command. You can fold a calltree (even multiple times using different fold commands) and then use 'toprofile' to convert this to a new profile. In the new profile the only your interesting code will show up in the function list, modules and files. Examples include:
 Profile|fold|Profile
 Profile|fold <type:FoldType>|Profile
 Profile|fold Forwarders <threshold:Single>|Profile
 Profile|fold InclusiveTime <threshold:Single>|Profile
 Profile|fold <type:FoldType><matchString: String>|Profile
 CallTreeData|fold|CallTreeData
 CallTreeData|fold <type:FoldType>|CallTreeData
 CallTreeData|fold Forwarders <threshold: Single>|CallTreeData
 CallTreeData|fold InclusiveTime <threshold: Single>|CallTreeData
 CallTreeData|fold <type:FoldType><matchString: String>|CallTreeData
 Have enum parameters:
 FoldType {Forwarders, FunctionAndChildren, InclusiveTime, Modules, ModlesExcept, OnlyThisFunction, Types, TypesForModules}

PerfConsole documentation discusses boxing, which is a form of grouping 326.

Frequently when looking at calltrees there are many methods which are not directly related to the code that you control. It's helpful to hide these initially to get an understanding of the overall system. Boxing allows you to do this by compacting a set of similar nodes in a calltree into a single boxed node. For instance, if you don't care about code in mscorlib you could say: 'box module mscorlib*', and then in your calltree you would see nodes that look like the following anyplace that before you might have seen a chain of methods in mscorlib.dll:
 [[Boxed Module: mscorlib.dll]]

Boxing is also allowed on Types and Forwarders. For Types and Modules the input to the box command is a match string which currently supports * as the wildcard character, e.g.: *corlib* or mscor* of *.dll. Additionally multiple match strings can be specified using a comma as a separator. For Forwarders the input is a threshold for boxing which defaults to zero. Boxing forwarders will box all the nodes which are under the given threshold and not places where the tree branches into a single boxed node. This may help eliminate noise where there is a long call chain that gets to something interesting at the end.

Note that boxing becomes very interesting when combined with the 'toprofile' command. You can box a calltree (even multiple times using different box commands) and then use 'toprofile' to convert this to a new profile. In the new profile the boxed entries will show up in the function list and even in butterflies as callers or callees of certain nodes. Some examples of syntax include:
 Profile|box|Profile
 Profile|box <type:BoxType>|Profile
 Profile|box Forwarders <threshold:Single>|Profile
 Profile|box <type:BoxType><matchString: String>|Profile
 CallTreeData|box|CallTreeData
 CallTreeData|box <type:BoxType>|CallTreeData
 CallTreeData|box Forwarders <threshold: Single>|CallTreeData
 CallTreeData|box <type:BoxType><matchString: String>|CallTreeData Have enum parameters:
 BoxType {Forwarders, Types, TypesForModules, Modules, ModulesExcept}

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 3 and 4 also help describe configured media, and help describe the operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A process of organizing program performance data in semantic groups, the performance data including multiple samples, each of the multiple samples having at least one name and at least one associated cost, the process comprising the steps of:
submitting a grouping expression to a performance analysis tool, the grouping expression specifying, in a transformation syntax language which supports pattern-matching, a pattern and a replacement for grouping multiple performance data samples, each of the performance data samples having a stack of names which represent nodes located in a directed acyclic graph (DAG) in a computer-readable memory, each of the nodes having an associated cost; and
getting from the performance analysis tool a cost accounting created by execution of instructions by a processor in response to the submitting step, the cost accounting showing names of the performance data samples and associated attributed costs, all of the names being consistent with the grouping expression.

2. The process of claim 1, wherein the submitted grouping expression also specifies an exception to the pattern.

3. The process of claim 1, wherein the submitting step comprises submitting a grouping expression which defines an entry group clustering, and the getting step comprises getting a cost accounting which shows at least one entry point name.

4. The process of claim 1, wherein the submitted grouping expression pattern matches at least one directory containing program code.

5. The process of claim 1, further comprising drilling down into a group shown in the cost accounting and then obtaining a cost accounting result specific to samples chosen by said drilling down.

6. The process of claim 1, wherein the submitted grouping expression pattern matches a name-associated characteristic of the performance data samples.

7. A computer-readable storage medium configured with data and with instructions that when executed by at least one processor causes the processor(s) to perform a process for organizing program performance data, the process comprising the steps of:
obtaining performance data which includes multiple samples, each of the samples having a stack of names which represent nodes located in a directed acyclic graph (DAG), each of the nodes having an associated cost;
receiving a grouping expression, written in a transformation syntax language and containing a non-trivial regular expression (namely, a regular expression which includes both literal and non-literal parts), to group nodes and consolidate costs by following at least one of the following procedures:
a clustering-by-name procedure,
an entry-group-clustering procedure,
a folding-by-name procedure,
a folding-by-cost procedure;
grouping nodes into at least one group as commanded in the grouping expression;
consolidating costs by associating with each group a total cost which is the sum of the cost(s) associated with individual node(s) of the group; and
producing a cost accounting showing group name(s) and associated group costs after grouping nodes and consolidating costs.

8. The configured medium of claim 7, wherein the process follows the clustering-by-name procedure, namely, the process groups nodes into at least one group on the basis of node names and irrespective of node locations in the DAG.

9. The configured medium of claim 7, wherein at least one group in the cost accounting has a group name that identifies a file system directory, and nodes which have code residing in that directory are grouped into that group.

10. The configured medium of claim 7, wherein the process follows the entry-group-clustering procedure, namely, the process groups nodes into an entry group on the basis of node names, an entry node is a border node of the entry group nodes in the DAG, and the cost accounting shows the entry group name together with the entry node name.

11. The configured medium of claim 10, wherein the entry node name identifies a method in a call stack DAG, namely, the method which was called upon entry to code that is represented by the entry group name.

12. The configured medium of claim 7, wherein the process produces a cost accounting for a memory allocation DAG.

13. The configured medium of claim 7, wherein the process follows the folding-by-name procedure, namely, the process groups nodes into a group represented by a remaining node on the basis of the nodes being reachable in the DAG from the remaining node and on the basis of node names.

14. The configured medium of claim 13, wherein the remaining node represents a method which invokes helper methods, and the process groups the helper methods and consolidates their cost with the cost of the remaining node.

15. The configured medium of claim 7, wherein the process follows the folding-by-cost procedure, namely, the process groups nodes into a group represented by a remaining node on the basis of the nodes being reachable in the DAG from the remaining node and on the basis of node cost being less than a specified threshold.

16. A computer system comprising:
a logical processor;
a memory in operable communication with the logical processor;
performance data residing in the memory and having multiple samples, each of the samples having a stack of names which represent nodes located in a directed acyclic graph (DAG), each of the nodes having an associated cost; and
a modified stack residing in the memory, the modified stack having at least a portion of at least one name and/or at least one name-associated characteristic in common with a stack of the performance data, the modified stack being different from the performance data in that at least one of the following is present in the modified stack and absent from the performance data:
a clustering-by-name group from a regular expression based search-and-substitute syntax,
an entry-group-clustering group from a regular expression based search-and-substitute syntax,
a folding-by-name group from a regular expression based search-and-substitute syntax,
a folding-by-cost group from a regular expression based search-and-substitute syntax.

17. The system of claim 16, wherein the system further comprises a performance analysis tool residing in the memory and configured for execution with the logical processor, the performance analysis tool configured to produce modified stacks.

18. The system of claim 16, wherein the memory is further configured by a clustering-by-name grouping specification which groups all nodes of a specified library into a single group, and that group is present in the modified stack.

19. The system of claim 16, wherein the memory is further configured by a clustering-by-name grouping specification which groups all nodes by library except for the nodes of a specified library, and the specified groups are present in the modified stack.

20. The system of claim 16, wherein the memory is further configured by an entry-group-clustering grouping specification which groups all nodes of an operating system into a single group, and that group is present in the modified stack with an entry point name identifying an operating system call made upon entry to the group.

* * * * *